US012403617B2

(12) United States Patent
Fukamachi et al.

(10) Patent No.: US 12,403,617 B2
(45) Date of Patent: Sep. 2, 2025

(54) JOINT MECHANISM AND MULTI-JOINT DEVICED

(71) Applicant: Sony Interactive Entertainment Inc., Tokyo (JP)

(72) Inventors: Katsutsugu Fukamachi, Kanagawa (JP); Keiji Togawa, Tokyo (JP); Hiroshi Osawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/550,168

(22) PCT Filed: Mar. 17, 2022

(86) PCT No.: PCT/JP2022/012415
§ 371 (c)(1),
(2) Date: Sep. 12, 2023

(87) PCT Pub. No.: WO2022/209984
PCT Pub. Date: Oct. 6, 2022

(65) Prior Publication Data
US 2024/0066722 A1   Feb. 29, 2024

(30) Foreign Application Priority Data
Mar. 30, 2021   (JP) .................. 2021-057986

(51) Int. Cl.
*B25J 17/00*   (2006.01)
*B25J 17/02*   (2006.01)
*F16H 1/14*   (2006.01)

(52) U.S. Cl.
CPC ............ *B25J 17/0258* (2013.01); *F16H 1/14* (2013.01)

(58) Field of Classification Search
CPC ....... B25J 17/0258; B25J 17/025; F16H 1/14; F16H 1/222; F16H 57/023
See application file for complete search history.

(56) References Cited

U.S. PATENT DOCUMENTS 3,419,158 A    12/1968   Lemelson
4,828,094 A *  5/1989    Torii .................. B25J 9/101
                                        192/139

(Continued)

FOREIGN PATENT DOCUMENTS

CN   107738259 A   2/2018
CN   112008741 A   12/2020

(Continued)

OTHER PUBLICATIONS

International Search Report for corresponding PCT Application No. PCT/JP2022/012415, 4 pages, dated Jun. 7, 2022.

(Continued)

*Primary Examiner* — Zakaria Elahmadi
(74) *Attorney, Agent, or Firm* — Kilpatrick Townsend & Stockton LLP

(57) ABSTRACT

Without an increase in the cost, a movable range is defined. A first joint mechanism includes a base part, and a rotary part that rotates relatively to the base part. The first joint mechanism includes a regulated part that rotates together with the rotary part, a regulating part that is disposed on the extension of the rotation locus of the regulated part, and that has a function of regulating rotation of the regulated part relative to the base part, within a first movable range, and a movable range defining member that is disposed on either the base part or the rotary part, and that defines, as a movable range of the regulated part, a second movable range that is narrower than the first movable range.

9 Claims, 13 Drawing Sheets

(56) References Cited

U.S. PATENT DOCUMENTS

| | | | | |
|---|---|---|---|---|
| 10,877,508 B2* | 12/2020 | Miyazaki | ................ | G05G 5/04 |
| 10,919,159 B2* | 2/2021 | Kassow | ............... | B25J 19/0004 |
| 2019/0171247 A1* | 6/2019 | Miyazaki | ................ | G05G 5/04 |
| 2023/0137602 A1* | 5/2023 | Glaum | ................ | F16H 57/023 |
| | | | | 74/412 R |

FOREIGN PATENT DOCUMENTS

| | | | | | |
|---|---|---|---|---|---|
| JP | 6228194 | A | | 2/1987 | |
| JP | 59166493 | A | | 9/1987 | |
| JP | 0413285 | U1 | | 2/1992 | |
| JP | H0413285 | U | | 2/1992 | |
| JP | H10202574 | A | * | 8/1998 | ............. B25J 19/00 |
| JP | 2003117858 | A | | 4/2003 | |
| JP | 201998463 | A | | 6/2019 | |

OTHER PUBLICATIONS

Extended European Search Report for corresponding EP Application No. EP 22780203, 9 pages, dated Mar. 4, 2025.

* cited by examiner

JOINT MECHANISM AND MULTI-JOINT DEVICED

TECHNICAL FIELD

The present disclosure relates to a joint mechanism and a multi-joint device.

BACKGROUND ART

For example, PTL 1 discloses a robot that has joints.

CITATION LIST

Patent Literature

[PTL 1] Japanese Patent Laid-Open No. 2003-117858

SUMMARY

Technical Problem

In order to prepare joint mechanisms having different movable ranges, it is necessary to separately manufacture the mechanisms according to the respective movable ranges. In addition, a part for regulating the movable range may be worn out and deteriorate due to long time use of the joint mechanism. If so, it is necessary to change the joint mechanism completely. Moreover, in a case where a plurality of joint mechanisms are used in one device, it is necessary to prepare a plurality of joint mechanisms having different movable ranges suitable for respective use positions or for respective purposes of use. These circumstances should bring about a cost increase.

Solution to Problem

The present disclosure proposes a joint mechanism including a base part and a rotary part that rotates relatively to the base part. The joint mechanism includes a regulated part that rotates together with the rotary part, a regulating part that is disposed on an extension of a rotation locus of the regulated part, and has a function of regulating rotation of the regulated part relative to the base part, within a first movable range, and a movable range defining member that is mounted on either the base part or the rotary part, and defines, as a movable range of the regulated part, a second movable range that is narrower than the first movable range. This joint mechanism can define the movable range without involving a cost increase.

The present disclosure proposes a multi-joint device including at least two joint mechanisms, in which the at least two joint mechanisms include a first joint mechanism and a second joint mechanism, and the movable range defining member is mounted on at least one of the first joint mechanism or the second joint mechanism. According to this multi-joint device, a multi-joint device including joint mechanisms having different movable ranges can be provided without involving a cost increase.

DESCRIPTION OF EMBODIMENT

Hereinafter, an embodiment of the present disclosure will be explained with reference to the drawings.

General Overview of Entire Configuration

Figure 1:
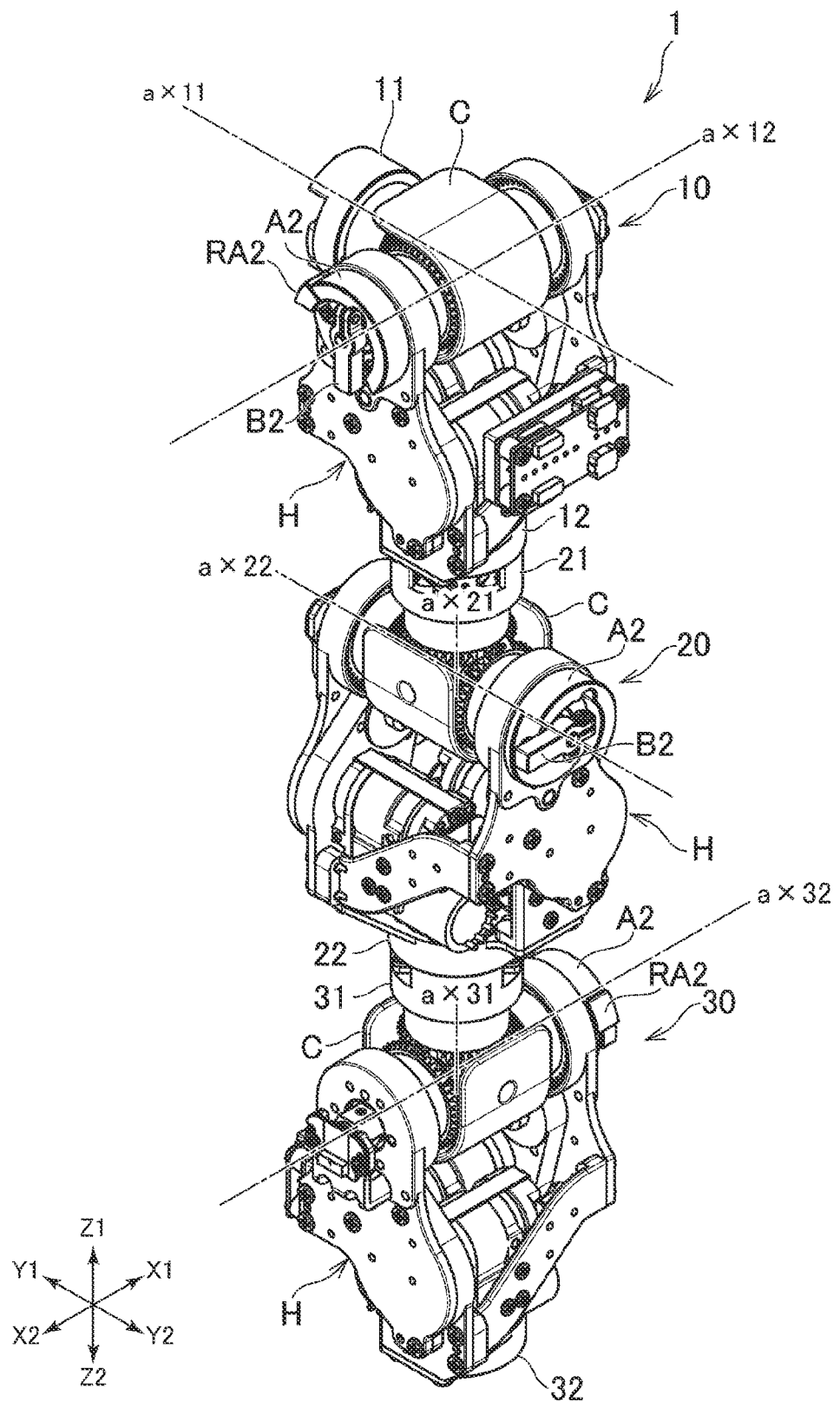
FIG. 1 is a perspective view of an upper rear side of a multi-joint device according to the present embodiment.
Figure 2:
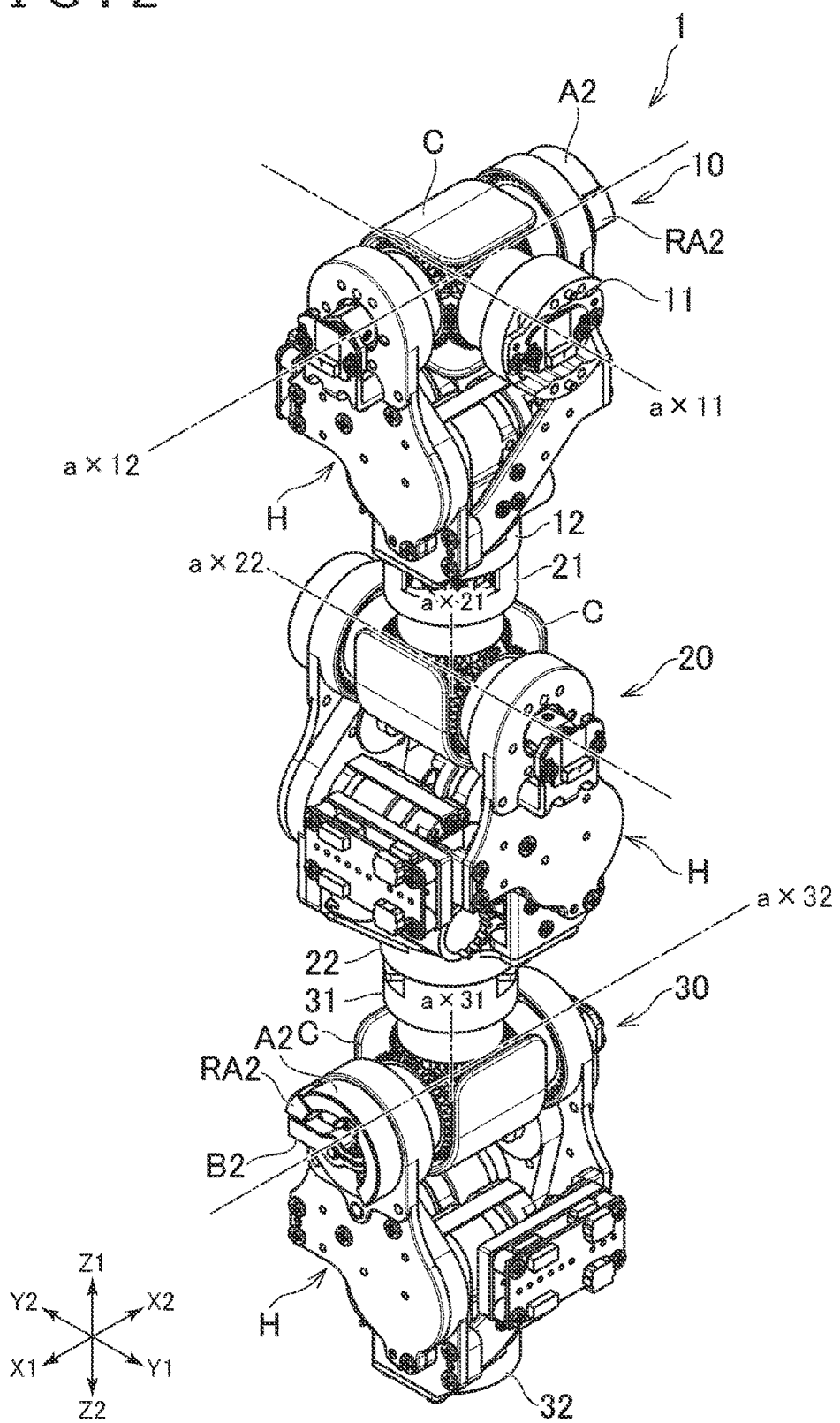
FIG. 2 is a perspective view of an upper front side of the multi-joint device according to the present embodiment.
Figure 3:
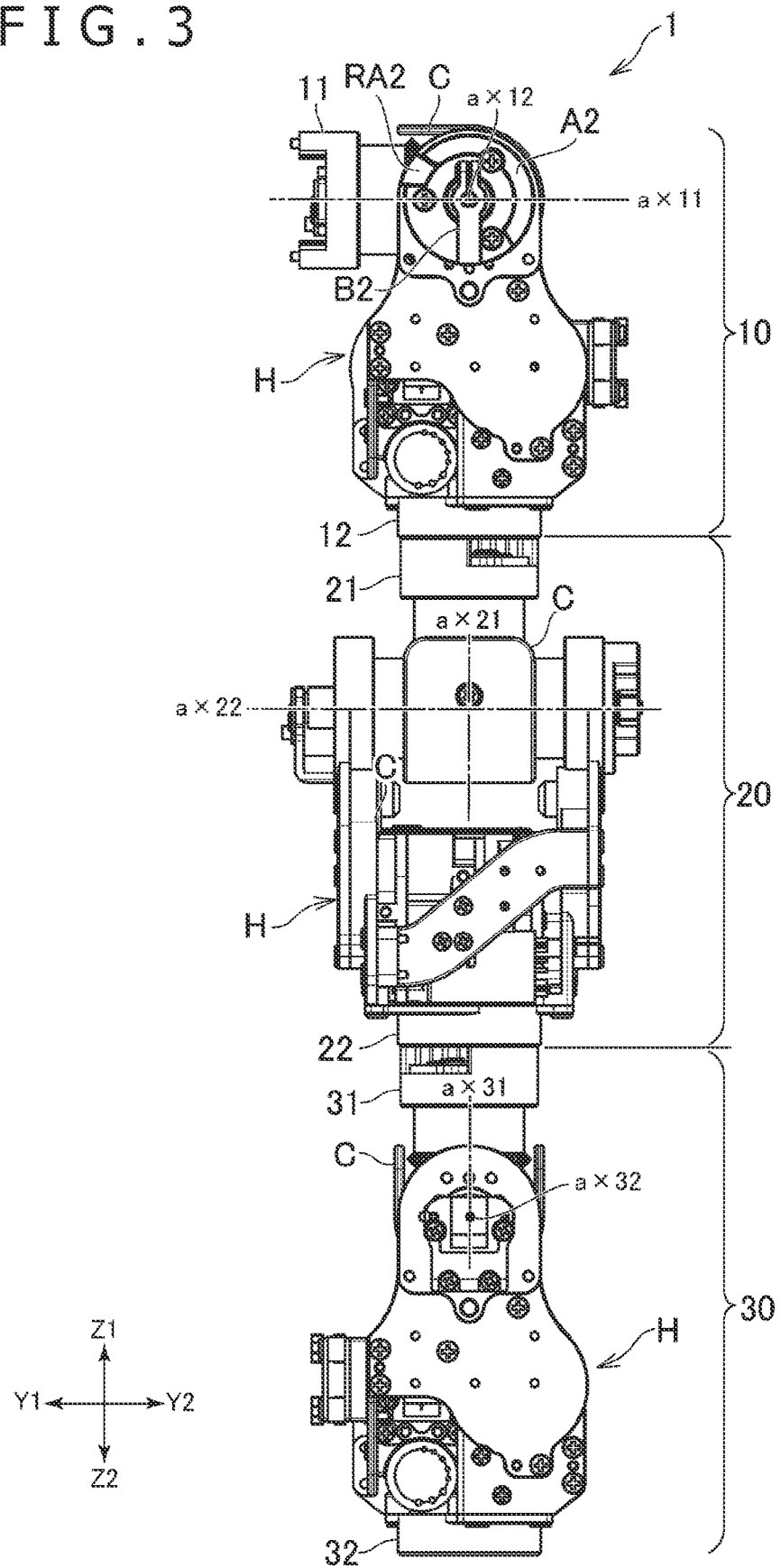
FIG. 3 is a left side view of the multi-joint device according to the present embodiment.
Figure 4:
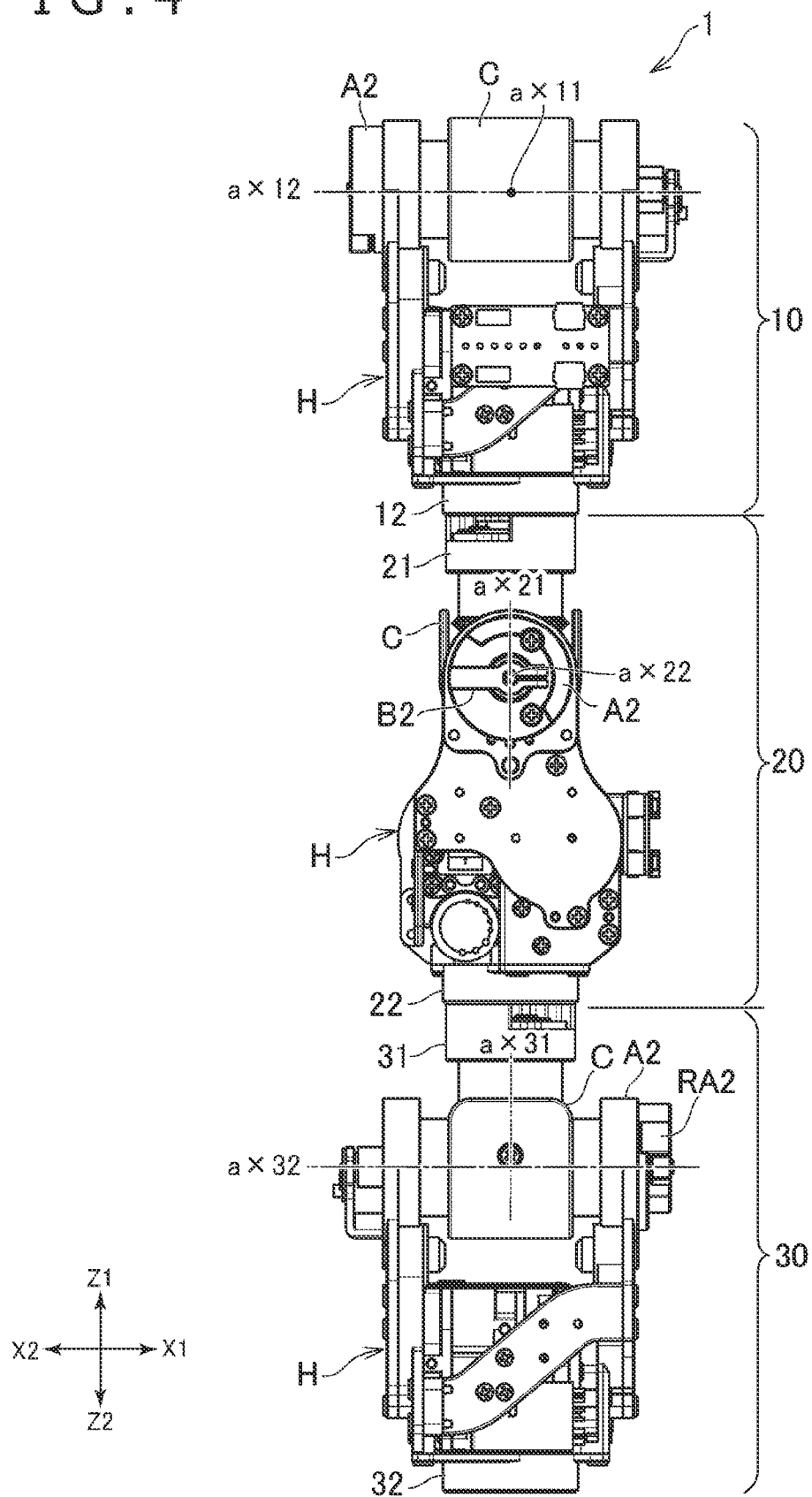
FIG. 4 is a rear view of the multi-joint device according to the present embodiment.

First, the general overview of the entire configuration of a multi-joint device 1 according to the present embodiment will be explained with reference to FIGS. 1 to 4. FIG. 1 is a perspective view of an upper rear side of the multi-joint device according to the present embodiment. FIG. 2 is a perspective view of an upper front side of the multi-joint device according to the present embodiment. FIG. 3 is a left side view of the multi-joint device according to the present embodiment. FIG. 4 is a rear view of the multi-joint device according to the present embodiment.

In the following explanation, an arrow X1, an arrow X2, an arrow Y1, an arrow Y2, an arrow Z1, and an arrow Z2 in the drawings indicate the right side, the left side, the front side, the rear side, the upper side, and the lower side, respectively. In FIGS. 1 to 4, an axis ax11 and an axis ax22 extend in the front-rear direction, an axis ax12 and an axis ax32 extend in the left-right direction, and an axis ax21 and an axis ax31 extend in the up-down direction. It is to be noted that none of these axes in the drawings exists in reality, and these axes are rotation centers for respective parts, which will be explained later. In the following explanation, the attitude of the multi-joint device 1 illustrated in FIGS. 1 to 4, is referred to as a "basic attitude."

In the present embodiment, the multi-joint device 1 includes a first joint mechanism 10, a second joint mechanism 20, and a third joint mechanism 30.

The first joint mechanism 10 includes a connection object part 11 at one end thereof, and a connecting part 12 at the other end thereof. In the first joint mechanism 10, the connection object part 11 is rotated relatively to the connecting part 12 about the axis ax11 and about the axis ax12 which extends in a direction perpendicular to the axis ax11. Thus, the first joint mechanism 10 is a generally-called biaxial integrated type.

Likewise, the second joint mechanism 20 includes a connection object part 21 at one end thereof, and a connecting part 22 at the other end thereof. In the second joint mechanism 20, the connection object part 21 is rotated relatively to the connecting part 22 about the axis ax21 and about the axis ax22 which extends in a direction perpendicular to the axis ax21. Thus, the second joint mechanism 20 is a generally-called biaxial integrated type. Likewise, the third joint mechanism 30 includes a connection object part 31 at one end thereof, and a connecting part 32 at the other end thereof. In the third joint mechanism 30, the connection object part 31 is rotated relatively to the connecting part 32 about the axis ax31 and about the axis ax32 which extends in a direction perpendicular to the axis ax31. Thus, the third joint mechanism 30 is a generally-called biaxial integrated type.

It is to be noted that the term "rotate" in the present description means an action of making a circular movement in either a clockwise direction or a counterclockwise direction about an axis at a circular movement angle of less than 360 degrees.

In FIGS. 1 to 4, the connecting part 12 of the first joint mechanism 10 is connected to the connection object part 21 of the second joint mechanism 20, and the connecting part 22 of the second joint mechanism 20 is connected to the connection object part 31 of the third joint mechanism 30. In this structure, rotation of the connection object part 21 relative to the connecting part 22 results in rotation of the first joint mechanism 10 relative to the second joint mechanism 20. In addition, rotation of the connection object part 31 relative to the connecting part 32 results in rotation of the first joint mechanism 10 and the second joint mechanism 20 relative to the third joint mechanism.

[Joint Mechanism]

Next, with reference to FIGS. 5 to 10, the details of the first joint mechanism 10 will be explained to exemplify a joint mechanism according to the present embodiment. It is to be noted that a detailed explanation of the second joint mechanism 20 and the third joint mechanism 30 will be omitted because these joint mechanisms have the same configuration and operate in the same manner as the first joint mechanism 10. It is to be noted that FIGS. 5 to 10 each illustrate the first joint mechanism 10 in a state where the multi-joint device 1 is in the basic attitude which is illustrated in FIG. 1, etc.

Figure 5:
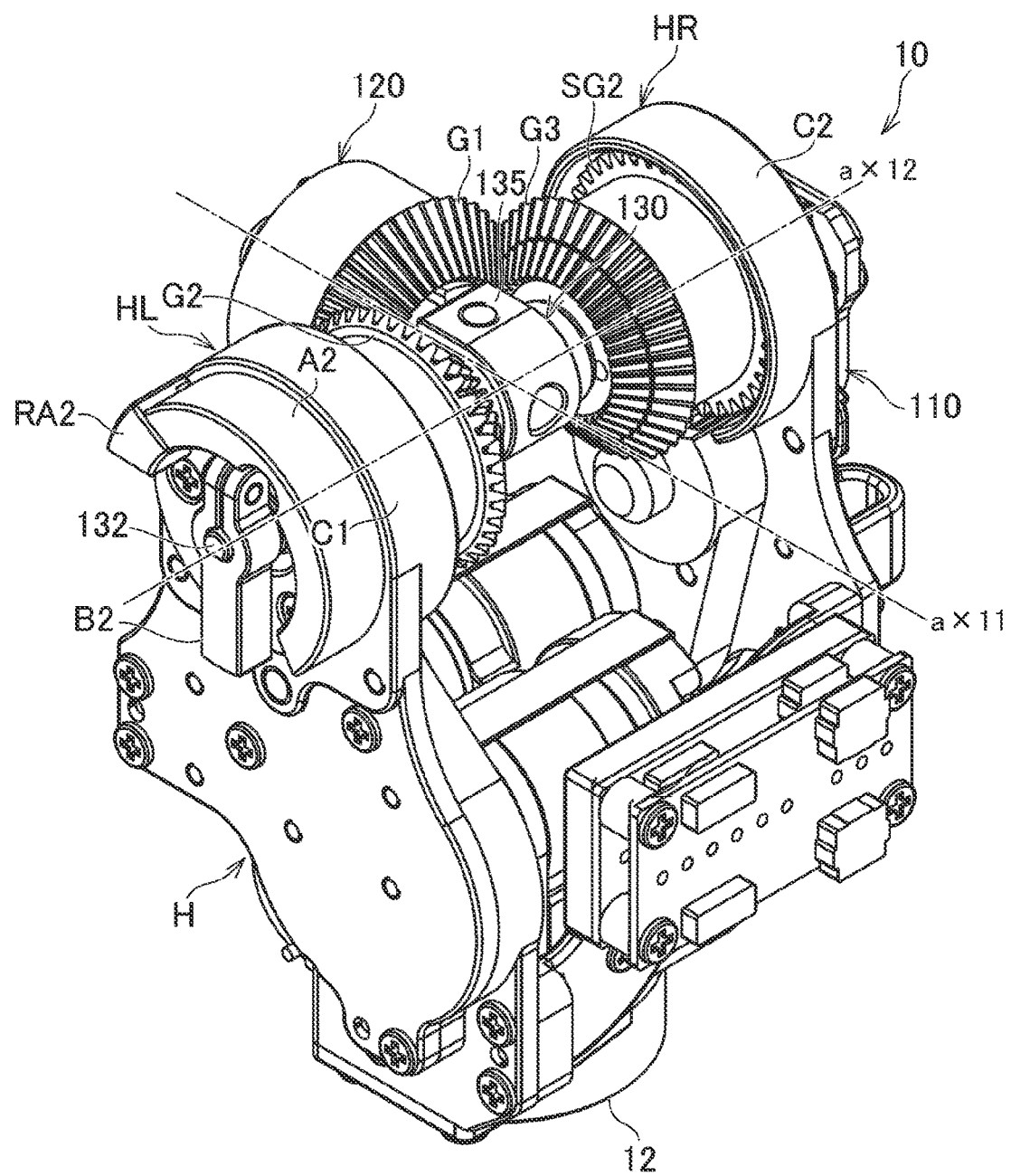
FIG. 5 is a perspective view of an upper rear side of a first joint mechanism according to the present embodiment.
Figure 6:
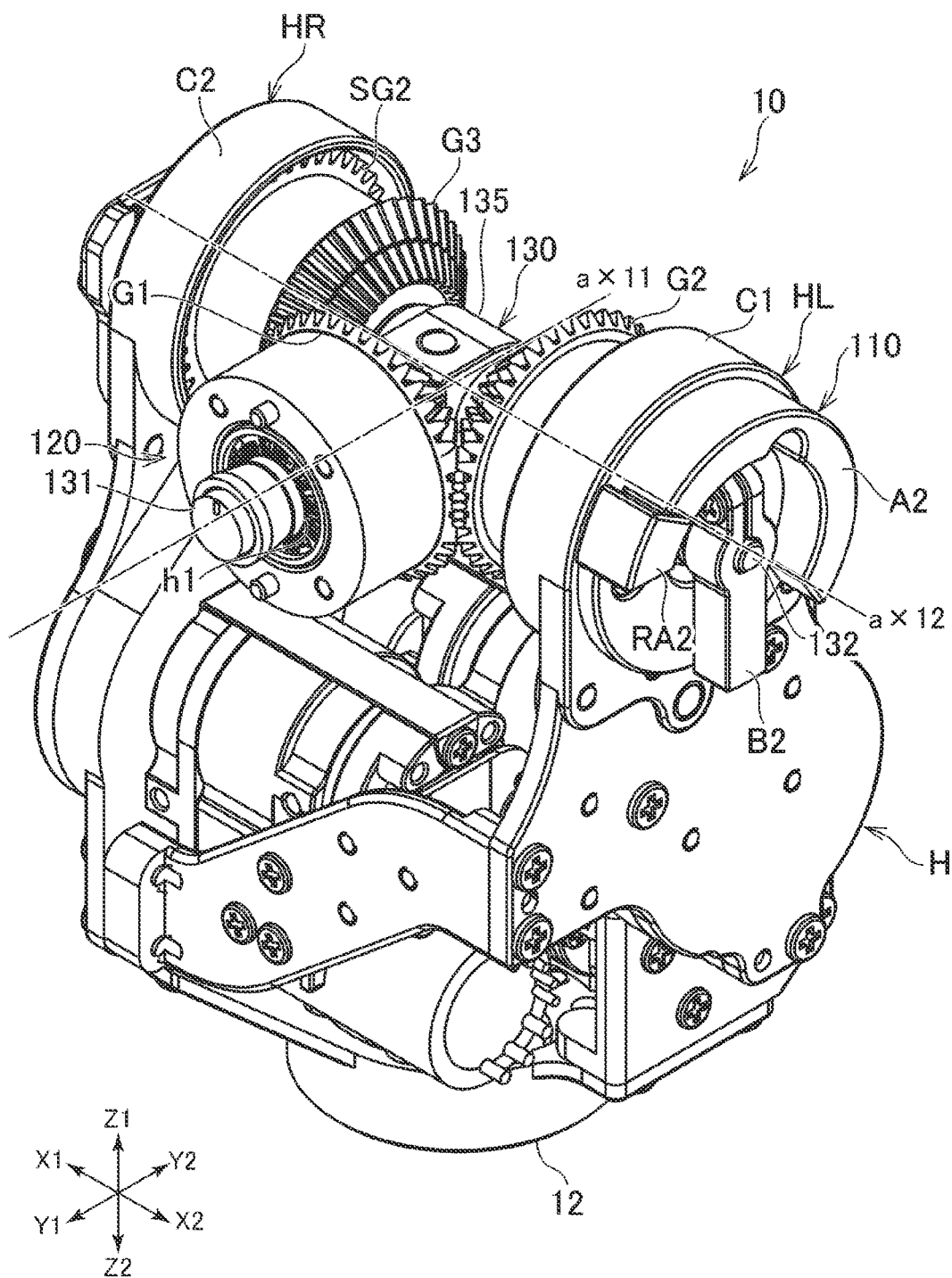
FIG. 6 is a perspective view of an upper front side of the first joint mechanism according to the present embodiment.
Figure 7:
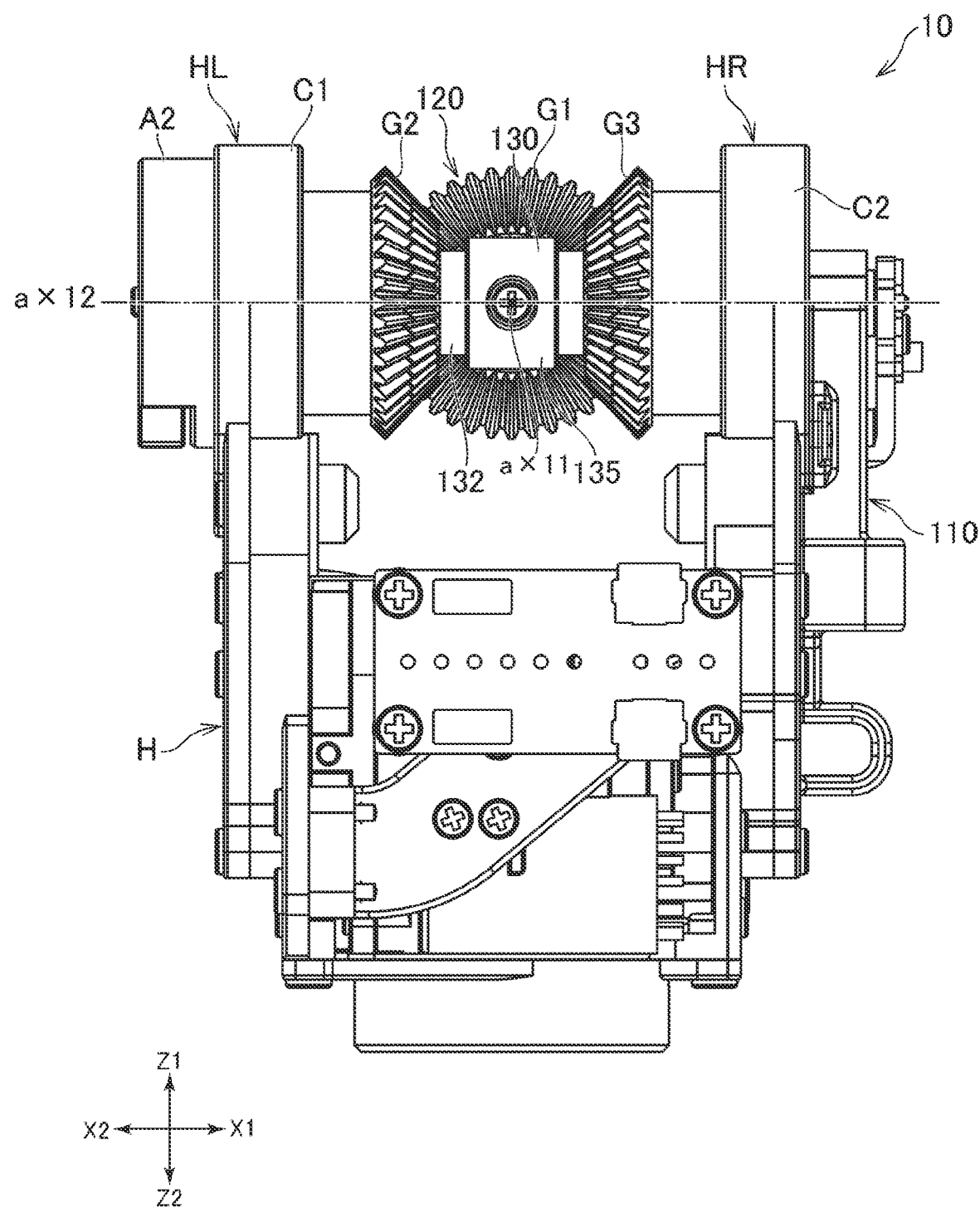
FIG. 7 is a rear view of the first joint mechanism according to the present embodiment.

FIG. 5 is a perspective view of the upper rear side of the first joint mechanism according to the present embodiment. FIG. 6 is a perspective view of the upper front side of the first joint mechanism according to the present embodiment. FIG. 7 is a rear view of the first joint mechanism according to the present embodiment. It is to be noted that a gear cover C which is illustrated in FIGS. 1 to 4, is not illustrated in FIGS. 5 to 7 in order to represent bevel gears, which will be explained later. It is to be noted that the gear covers C are intended to inhibit the bevel gears from being viewed from the outside, and to protect the bevel gears against dust or the like.

Figure 8:
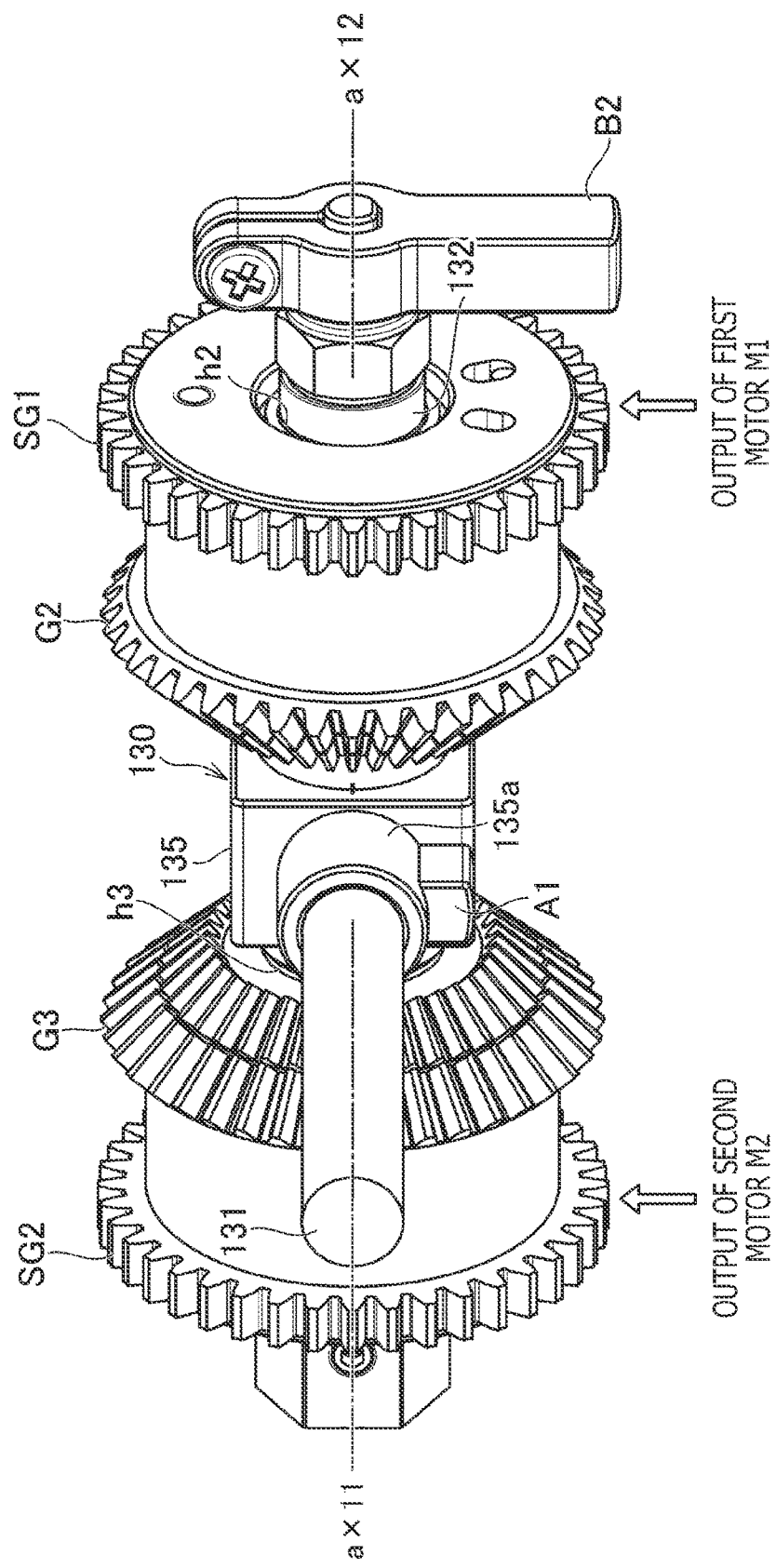
FIG. 8 is a perspective view of a second bevel gear, a third bevel gear, and the periphery thereof in the first joint mechanism according to the present embodiment.
Figure 9:
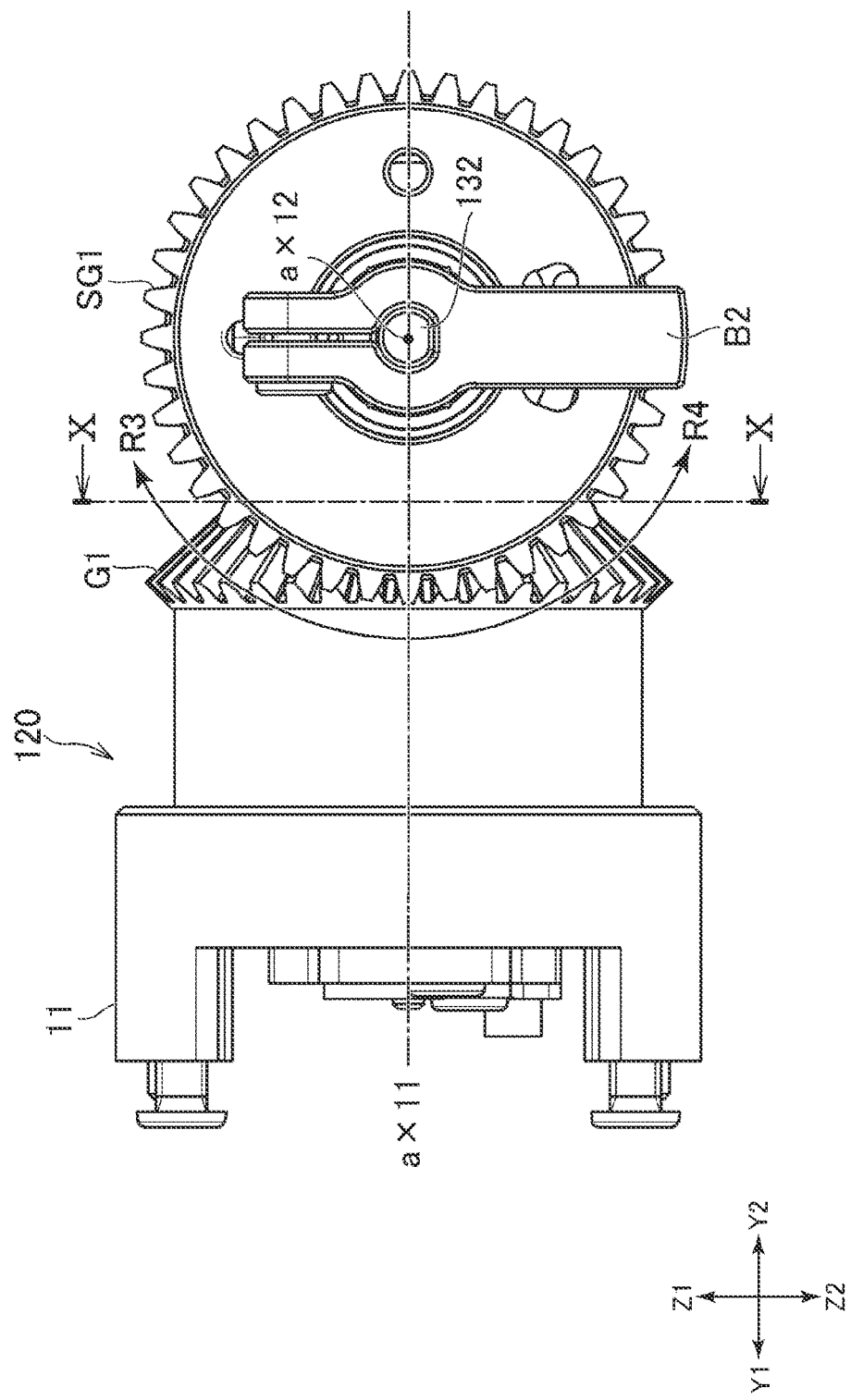
FIG. 9 is a left side view of a first bevel gear and the periphery thereof according to the present embodiment.
Figure 10:
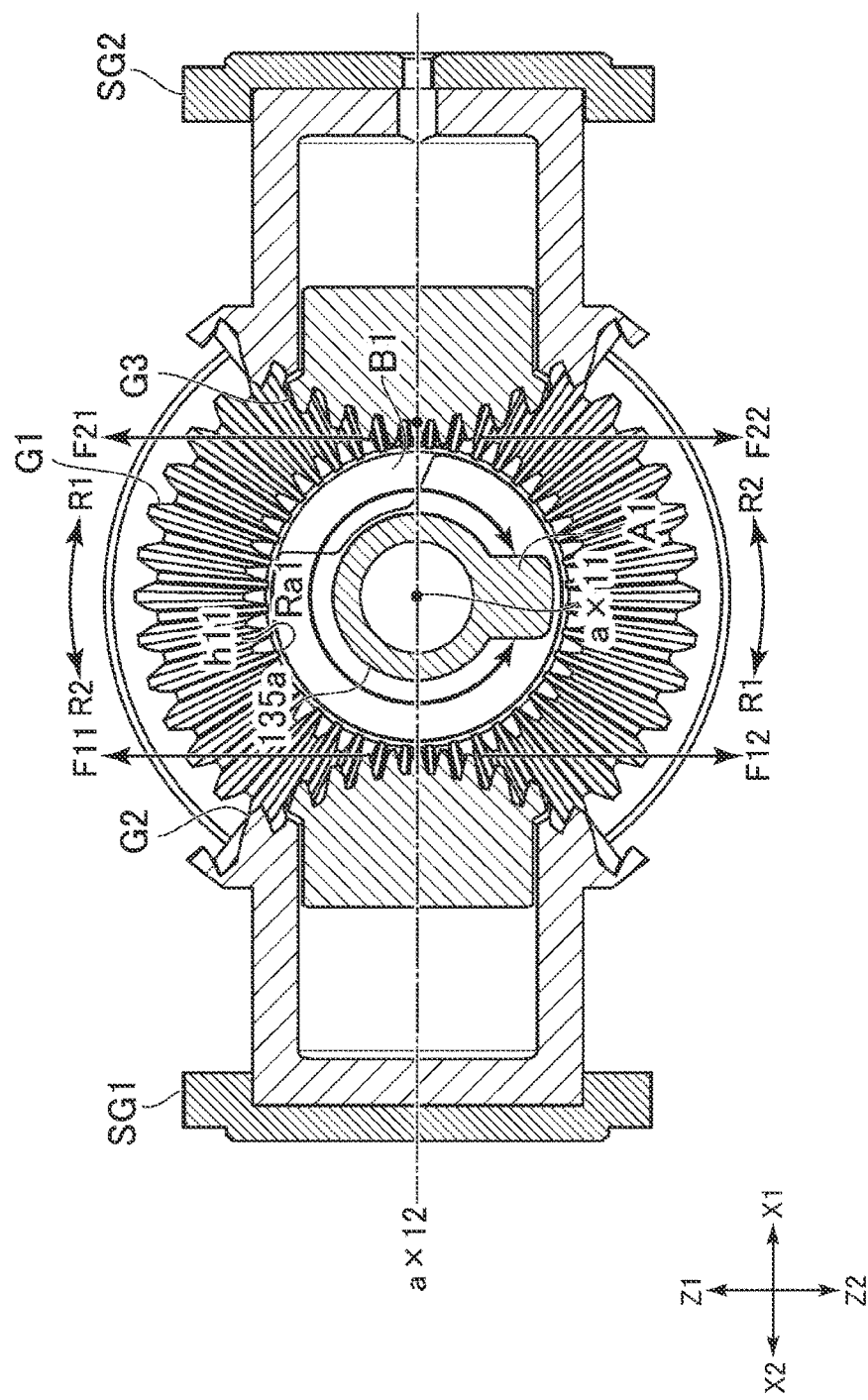
FIG. 10 is a cross-sectional view taken along line X-X in FIG. 9.

FIG. 8 is a perspective view of a second bevel gear, a third bevel gear, and the periphery thereof in the first joint mechanism according to the present embodiment. FIG. 9 is a left side view of a first bevel gear and the periphery thereof. FIG. 10 is a cross-sectional view taken along line X-X in FIG. 9.

The first joint mechanism 10 mainly includes a base part 110 and a rotary part 120. The rotary part 120 rotates relatively to the base part 110. Specifically, in the first joint mechanism 10, the rotary part 120 rotates when the base part 110 is fixed to a member that is external to the first joint mechanism 10, and the base part 110 rotates when the rotary part 120 is fixed to a member that is external to the first joint mechanism 10. The following explanation describes an example in which the rotary part 120 rotates while the base part 110 is fixed to a member that is external to the first joint mechanism 10.

The first joint mechanism 10 further includes a support part 130. Incidentally, when the rotary part 120 rotates about the axis ax11, the support part 130 becomes a portion of the base part 110, and, when the rotary part 120 rotates about the axis ax12, the support part 130 becomes a portion of the rotary part 120, which will be explained in detail later. Specifically, when the rotary part 120 rotates about the axis ax11, the support part 130 rotates relative to the rotary part 120, and, when the rotary part 120 rotates about the axis ax12, the support part 130 rotates relative to the base part 110.

[Joint Mechanism: Rotary Part 120]

The rotary part 120 includes the connection object part 11 and a first bevel gear G1, as illustrated in FIG. 9. The connection object part 11 and the first bevel gear G1 are integrally formed. Therefore, the connection object part 11 rotates together with the first bevel gear G1. It is to be noted that illustration of the connection object part 11 is omitted in FIGS. 5 and 6.

The rotation center of the first bevel gear G1 is the axis ax11. A bearing hole h1 through which a first support shaft 131 of the support part 130, which will be explained later, is inserted is formed in the center portion of the first bevel gear G1. The bearing hole h1 may be formed to reach the rear surface side of the first bevel gear G1 (see FIG. 6).

[Joint Mechanism: Base Part 110]

The base part 110 includes an exterior housing H that forms the exterior of the first joint mechanism 10, a second bevel gear G2, and a third bevel gear G3. The rotation center of the second bevel gear G2 and the third bevel gear G3 is the axis ax12.

The second bevel gear G2 is disposed so as to be engaged with the first bevel gear G1, and to rotate about the axis ax12, as illustrated in FIGS. 5, 10, or the like.

The second bevel gear G2 is formed integrally with a spur gear SG1, as illustrated in FIGS. 8 and 10. Upon receiving a driving force from a first motor M1 which is a driving source, the spur gear SG1 rotates. The second bevel gear G2 rotates together with the spur gear SG1. A driving force from the first motor M1 may be inputted to the spur gear SG1 via a speed reduction gear or the like. The first motor M1 may be housed in the exterior housing H. It is to be noted that a detailed explanation of the structure and arrangement of the first motor M1 will be omitted. The same applies to a second motor M2, which will be explained later.

A bearing hole h2 through which a second support shaft 132 of the support part 130, which will be explained later, is inserted is formed in the center portion of the second bevel gear G2. The bearing hole h2 is formed so as to reach the rear surface side of the spur gear SG1 (see FIG. 8).

The third bevel gear G3 is engaged with the first bevel gear G1, as illustrated in FIGS. 7, 10, or the like. Further, the third bevel gear G3 is disposed so as to face the second bevel gear G2 in the axis ax12 direction, and rotates about the axis ax12.

The third bevel gear G3 is formed integrally with a spur gear SG2, as illustrated in FIGS. 8 and 10. Upon receiving a driving force from a second motor M2 which is a driving source that is different from the first motor M1, the spur gear SG2 rotates. The third bevel gear G3 rotates together with the spur gear SG2. It is to be noted that a driving force from the second motor M2 may be inputted to the spur gear SG2 via a speed reduction gear or the like.

A bearing hole h3 through which a second support shaft 132 of the support part 130, which will be explained later, is inserted is formed in the center portion of the third bevel gear G3 (see FIG. 8).

It is to be noted that FIG. 10 or the like illustrates the second bevel gear G2 including two radially split members. However, this is just an example. The second bevel gear G2 may be formed of one member. The same applies to the third bevel gear G3.

[Joint Mechanism: Support Part 130]

The support part 130 includes the first support shaft 131 extending along the axis ax11, and the second support shaft 132 extending along the axis ax12. The first support shaft 131 and the second support shaft 132 each have a columnar shape or a cylindrical shape.

The support part 130 supports the first bevel gear G1, the second bevel gear G2, and the third bevel gear G3. More specifically, the first support shaft 131 of the support part 130 is inserted through the bearing hole h1 formed in the first bevel gear G1, and supports the first bevel gear G1. Also, the second support shaft 132 of the support part 130 is inserted through the bearing hole h2 formed in the second bevel gear G2 and the bearing hole h3 formed in the third bevel gear G3, and supports the second bevel gear G2 and the third bevel gear G3. It is to be noted that a bearing or the like (not illustrated) is preferably disposed between the outer circumferential surface of the first support shaft 131 and the inner circumferential surface of the bearing hole h1 in the first bevel gear G1. Likewise, bearings or the like are preferably disposed between the outer circumferential surface of the second support shaft 132 and the inner circumferential surface of the bearing hole h2 in the second bevel gear G2 and between the outer circumferential surface of the second support shaft 132 and the inner circumferential surface of the bearing hole h3 in the third bevel gear G3.

The support part 130 is separate from the first bevel gear G1, the second bevel gear G2, and the third bevel gear G3. Specifically, the first bevel gear G1 is supported by the first support shaft 131 in such a way that the inner circumferential surface of the bearing hole h1 in the first bevel gear G1 is rotatable about the axis ax11 relatively to the outer circumferential surface of the first support shaft 131. Also, the second bevel gear G2 is supported by the second support shaft 132 in such a way that the inner circumferential surface of the bearing hole h2 in the second bevel gear G2 is rotatable about the axis ax12 relatively to the outer circumferential surface of the second support shaft 132. In addition, the third bevel gear G3 is supported by the second support shaft 132 in such a way that the inner circumferential surface of the bearing hole h3 in the third bevel gear G3 is rotatable about the axis ax12 relatively to the outer circumferential surface of the second support shaft 132.

The second support shaft 132 is supported by a bearing (not illustrated) that is disposed on an upper right part HR of the exterior housing H and an upper left part HL of the exterior housing H so as to connect the upper right part HR and the upper left part HL, as illustrated in FIG. 5, or the like. It is to be noted the upper right part HR includes a cover part C2 that covers the spur gear SG2, as illustrated in FIGS. 5 and 6. The cover part C2 is a part of the exterior housing H, and has a bottomed tubular shape formed along the outer shape of the spur gear SG2. The upper left part HL also includes a cover part C1 that covers the spur gear SG1. The cover part C1 is a part of the exterior housing H, and has a bottomed tubular shape formed along the outer shape of the spur gear SG1.

The second support shaft 132 passes through the bearing hole h2, and is projected from the rear surface side of the spur gear SG1, as illustrated in FIG. 8 or the like. In addition, a regulated part B2 extending in a direction perpendicular to the axis ax12 is mounted on a projection that is a portion, of the second support shaft 132, projected from the rear surface side of the spur gear SG1. The regulated part B2 is mounted on the second support shaft 132 so as to rotate together with rotation of the second support shaft 132 about the axis ax12. It is to be noted that the details of the regulated part B2 will be explained later.

In addition, the support part 130 includes an intervening section 135 that is a section where the first support shaft 131 and the second support shaft 132 intersect with each other, and intervenes between the second bevel gear G2 and the third bevel gear G3, as illustrated in FIGS. 5, 8, or the like. With the intervening section 135, the second bevel gear G2 and the third bevel gear G3 are positioned with respect to the extension direction of the axis ax12. The intervening section 135 is formed integrally with the first support shaft 131 and the second support shaft 132.

Further, the intervening section 135 includes a diameter enlarged section 135a that has a larger diameter than the first support shaft 131 and is integrated with the first support shaft 131, as illustrated in FIG. 8. A regulating part A1 extending in a direction perpendicular to the axis ax11 is formed on the outer circumferential surface of the diameter enlarged section 135a. It is to be noted that the details of the regulating part A1 will be explained later.

It is to be noted that, on a side opposite to the diameter enlarged section 135a in the extension direction of the axis ax11, the gear cover C which is illustrated in FIG. 1, etc., but is not illustrated in FIGS. 5 to 10, is preferably fixed to the intervening section 135.

[Joint Mechanism: Rotation about Axis Ax11]

As previously explained, the second bevel gear G2 rotates upon receiving a driving force outputted from the first motor M1, while the third bevel gear G3 rotates upon receiving a driving force outputted from the second motor M2.

If the second bevel gear G2 rotates clockwise with respect to the X2 direction, a force F11 acts upwardly in a portion, of the first bevel gear G1, engaged with the second bevel gear G2 (see FIG. 10). If the third bevel gear G3 rotates counterclockwise with respect to the X2 direction, a force F22 acts downwardly in a portion, of the first bevel gear G1, engaged with the third bevel gear G3 (see FIG. 10). With the force F11 and the force F22, the first bevel gear G1 rotates about the axis ax11 to an R1 direction (clockwise direction) which is illustrated in FIG. 10. According to the R1 direction rotation of the first bevel gear G1, the rotary part 120 rotates clockwise with respect to the Y2 direction.

If the second bevel gear G2 rotates counterclockwise with respect to the X2 direction, a force F12 acts downwardly in a portion, of the first bevel gear G1, engaged with the second bevel gear G2 (see FIG. 10). If the third bevel gear G3 rotates clockwise with respect to the X2 direction, a force F21 acts upwardly in a portion, of the first bevel gear G1, engaged with the third bevel gear G3 (see FIG. 10). With the force F12 and the force F21, the first bevel gear G1 rotates about the axis ax11 to an R2 direction (counterclockwise direction) which is illustrated in FIG. 10. According to the R2 direction rotation of the first bevel gear G1, the rotary part 120 rotates counterclockwise with respect to the Y2 direction.

Thus, if the second bevel gear G2 and the third bevel gear G3 rotate oppositely with respect to the same direction, the first bevel gear G1 rotates about the axis a11. As a result, the rotary part 120 rotates about the axis ax11 relatively to the base part 110.

[Joint Mechanism: Rotation about Axis Ax12]

If the second bevel gear G2 rotates clockwise with respect to the X2 direction, the force F11 acts upwardly in a portion, of the first bevel gear G1, engaged with the second bevel gear G2 (see FIG. 10). If the third bevel gear G3 rotates clockwise with respect to the X2 direction, the force F21 acts upwardly in a portion, of the first bevel gear G1, engaged with the third bevel gear G3 (see FIG. 10). With these upward forces F11 and F21, the first bevel gear G1 rotates about the axis ax12 so as to follow the shape of the second bevel gear G2 and the shape of the third bevel gear G3. Accordingly, the rotary part 120 rotates about the axis ax12 to an R3 direction which is illustrated in FIG. 9.

If the second bevel gear G2 rotates counterclockwise with respect to the X2 direction, the force F12 acts downwardly in a portion, of the first bevel gear G1, engaged with the second bevel gear G2 (see FIG. 10). If the third bevel gear G3 rotates counterclockwise with respect to the X2 direction, the force F22 acts downwardly in a portion, of the first bevel gear G1, engaged with the third bevel gear G3 (see FIG. 10). With these downward forces F12 and F22, the first bevel gear G1 rotates about the axis ax12 so as to follow the shape of the second bevel gear G2 and the shape of the third bevel gear G3. Accordingly, the rotary part 120 rotates about the axis ax12 to an R4 direction which is illustrated in FIG. 9.

In addition, when the rotary part 120 including the first bevel gear G1 rotates about the axis ax12 to the R3 or R4 direction illustrated in FIG. 9, the outer circumferential surface of the first support shaft 131 of the support part 130 is pushed against the inner circumferential surface of the bearing hole h1 in the first bevel gear G1. Accordingly, the support part 130 rotates about the axis ax12.

[Movable Range of Joint Mechanism]

The present embodiment adopts a configuration of physically regulating the rotational movable ranges of the first joint mechanism 10 about the axis ax11 and the axis ax12. More specifically, the rotational movable range about the axis ax11 is regulated by the regulating part A1, and the rotational movable range about the axis ax12 is regulated by a regulating part A2. A more specific explanation will be given below.

[Movable Range of Joint Mechanism: Rotation about Axis Ax11]

Figure 11:
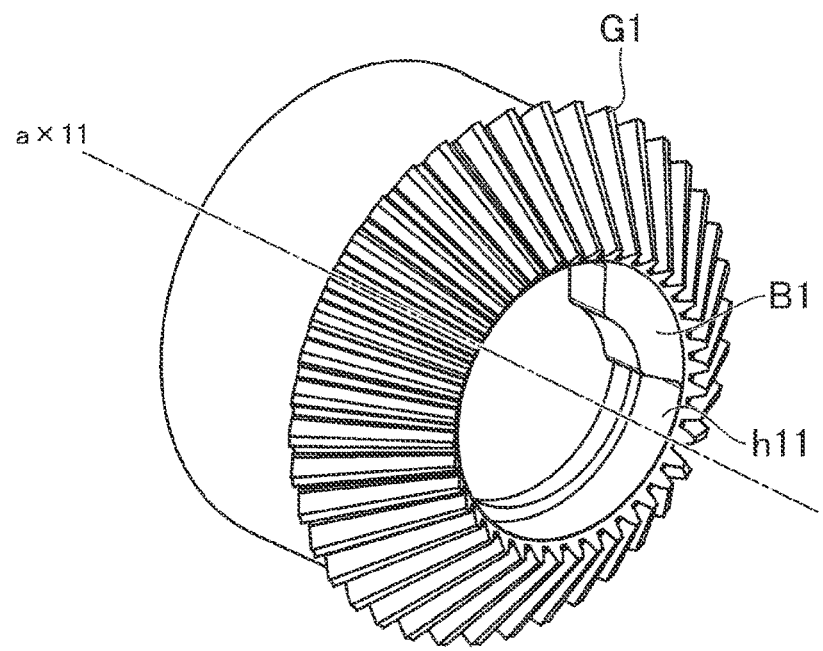
FIG. 11 is a perspective view of the first bevel gear according to the present embodiment.

FIG. 11 is a perspective view of a first bevel gear according to the present embodiment.

In the first bevel gear G1, a center hole h11 having a larger diameter than the bearing hole h1 through which the first support shaft 131 is inserted, is formed coaxially with the bearing hole h1. A regulated part B1 is disposed on the inner circumferential surface of the center hole h11. The regulated part B1 rotates about the axis ax11 together with rotation of the first bevel gear G1 about the axis ax11.

The regulating part A1 is disposed on the first support shaft 131 of the support part 130, as illustrated in FIG. 8 or the like. The regulating part A1 is disposed on the extension of the rotation locus of the regulated part B1. The regulating part A1 has a function of regulating rotation of the regulated part B1 within a first movable range Ra1 which is illustrated in FIG. 10.

For example, if the first bevel gear G1 rotates about the axis ax11 to the R1 direction which is illustrated in FIG. 10, the regulated part B1 rotates to the R1 direction together with the rotation of the first bevel gear G1. After rotating by a prescribed angle about the axis ax11, the regulated part B1 comes into contact with the regulating part A1. When the regulated part B1 is caught on the regulating part A1 in this manner, the rotation of the regulated part B1 to the R1 direction is regulated.

If the first bevel gear G1 rotates about the axis ax11 to the R2 direction which is illustrated in FIG. 10, the regulated part B1 rotates to the R2 direction together with the rotation of the first bevel gear G1. After rotating by a prescribed angle about the axis ax11, the regulated part B1 comes into contact with the regulating part A1. When the regulated part B1 is caught on the regulating part A1 in this manner, the rotation of the regulated part B1 to the R2 direction is regulated.

Rotation of the regulated part B1 about the axis ax11 is regulated in this manner, so that rotation of the rotary part 120 about the axis ax11 relative to the base part 110 is regulated.

Figure 12:
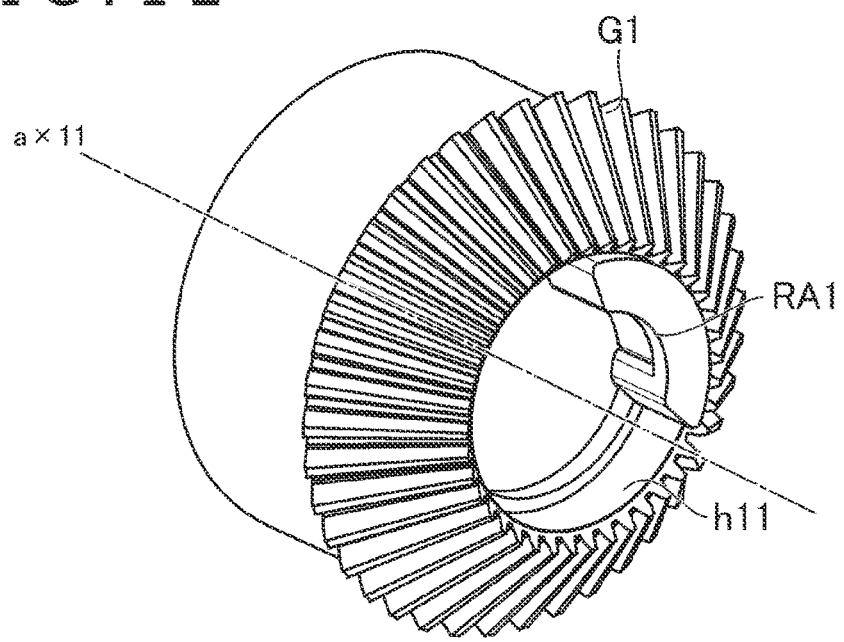
FIG. 12 is a perspective view of a movable range defining member mounted on a regulated part illustrated in FIG. 11.

In the first joint mechanism 10 according to the present embodiment, a movable range defining member RA1 is mounted on the regulated part B1 of the first bevel gear G1. FIG. 12 is a perspective view of a movable range defining member mounted on the regulated part illustrated in FIG. 11.

The movable range defining member RA1 is configured to set the movable range of the regulated part B1 to be narrower than the first movable range Ra1 which is illustrated in FIG. 10. The movable range defining member RA1 is separate from the regulated part B1, and is preferably attachable to/detachable from the regulated part B1.

FIG. 12 illustrates an example in which the movable range defining member RA1 is formed so as to almost completely cover the regulated part B1, and has a length in the circumferential direction of the axis ax11, longer than the regulated part B1. However, the movable range defining member RA1 is not limited to this example. It is sufficient to dispose the movable range defining member RA1 in such a way that the movable range of the regulated part B1 becomes narrower than at least the first movable range Ra1 illustrated in FIG. 10. For example, the movable range defining member RA1 may be mounted to cover only one end side, in the circumferential direction of the axis ax11, of the regulated part B1. The movable range defining member RA1 is not necessarily formed to cover the regulated part B1, and thus, the movable range defining member RA1 may be disposed apart from the regulated part B1 in the circumferential direction of the axis ax11. In this case, it is preferable that the movable range defining member RA1 is fixedly mounted on the inner circumferential surface of the center hole h11 in the first bevel gear G1.

In the present embodiment, since the movable range defining member RA1 is used, the movable range of rotation of the rotary part 120 about the axis ax11 can be controlled for the purpose of use of the first joint mechanism 10, etc. Therefore, as a result of use of the first joint mechanism 10 according to the present embodiment, it is not necessary to prepare joint mechanisms having different movable ranges according to respective purposes of use. Consequently, a cost increase can be suppressed.

Further, since the regulated part B1 is configured to come into contact with the regulating part A1 according to rotation about the axis ax11, the regulated part B1 may be worn out and deteriorate after a long-term use. In the present embodiment, the movable range defining member RA1 is mounted so as to cover the regulated part B1, so that the regulated part B1 is inhibited from being worn out or deteriorating. That is, the movable range defining member RA1 additionally has a function of protecting the regulated part B1. If the movable range defining member RA1 is worn out and deteriorates, the movable range defining member RA1 can be removed from the regulated part B1, and be replaced with a new one. Since the movable range defining member RA1 is replaceable, it is not necessary to replace the first joint mechanism 10 itself even when the movable range defining member RA1 is worn out and deteriorates. Thus, a cost increase can be suppressed. It is to be noted that it is sufficient that the movable range defining member RA1 is separate from at least the regulated part B1. The movable range defining member RA1 include the same material as that of the regulated part B1, or may include a material different from the material of the regulated part B1.

[Movable Range of Joint Mechanism: Rotation about Axis Ax12]

Figure 13:
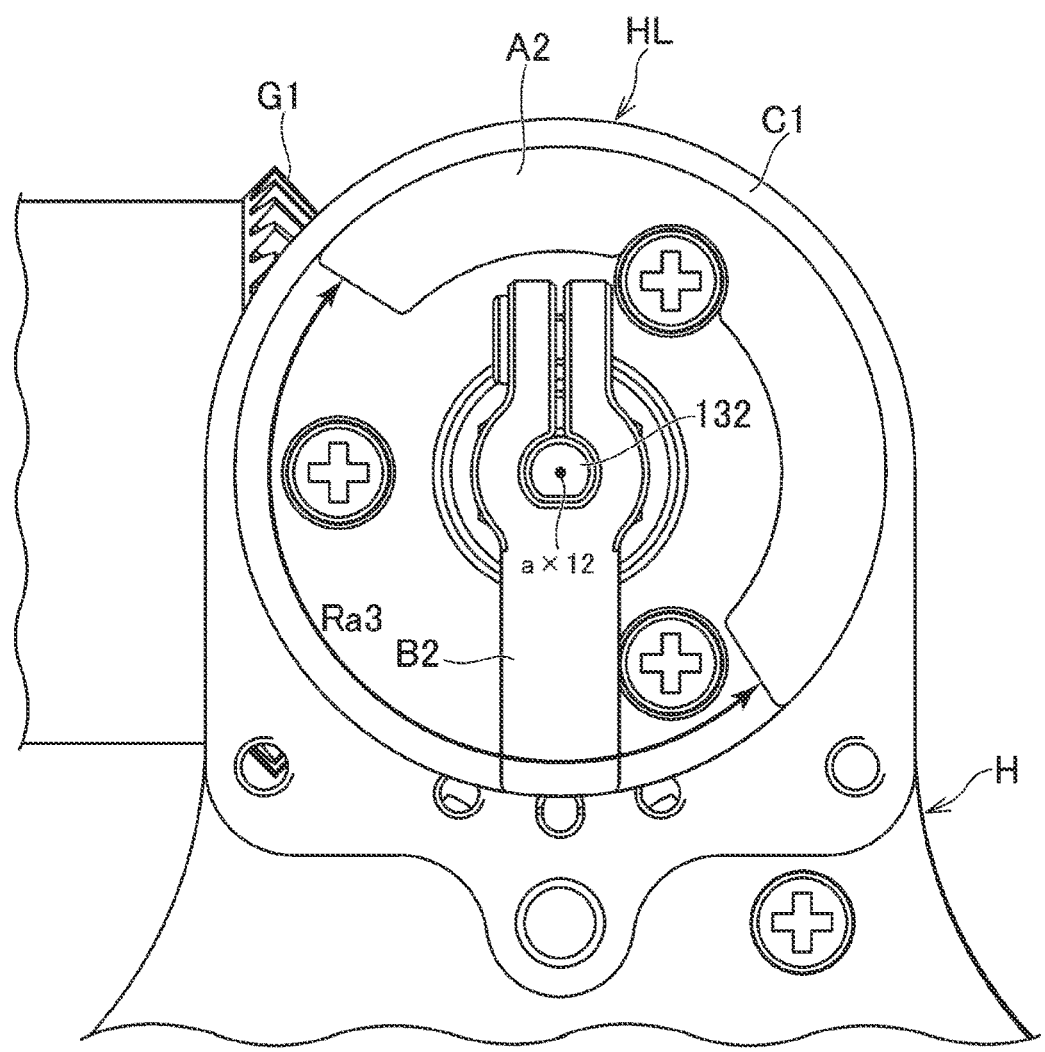
FIG. 13 is a left side view of a regulated part that rotates about an axis ax12, a regulating part that regulates rotation of the regulated part, and the periphery thereof.

FIG. 13 is a left side view of a regulated part that rotates about the axis ax12, a regulating part that regulates rotation of the regulated part, and the periphery thereof.

The regulating part A2 is disposed in the upper left part HL (cover part C2) of the exterior housing H of the first joint mechanism 10. The regulating part A2 is disposed on the extension of the rotation locus of the supported part B2. The regulating part A2 has a function of regulating rotation of the regulated part B2 within a prescribed movable range. It is preferable that the regulating part A2 has an arc shape following the shape of the upper left part HL (cover part C2), as illustrated in FIG. 5 or the like. The regulating part A2 regulates the movable range of the regulated part B2 according to the length of the regulating part A2 in the circumferential direction of the axis ax12. Specifically, when the regulating part A2 is long in the circumferential direction of the axis ax12, the movable range of the regulated part B2 is narrow. When the regulating part A3 is short in the circumferential direction of the axis ax12, the movable range of the regulated part B2 is wide.

For example, if the first bevel gear G1 rotates about the axis ax12 to the R3 direction which is illustrated in FIG. 9, the regulated part B2 rotates to the R3 direction together with the rotation of the first bevel gear G1. Then, after rotating by a prescribed angle about the axis ax12, the regulated part B2 comes into contact with the regulating part A2. When the regulated part B2 is caught on the regulating part A2 in this manner, the rotation of the regulated part B2 to the R3 direction is regulated.

If the first bevel gear G1 rotates about the axis ax12 to the R4 direction which is illustrated in FIG. 9, the regulated part B2 rotates to the R4 direction together with the rotation of the first bevel gear G1. After rotating by a prescribed angle about the axis ax12, the regulated part B2 comes into contact with the regulating part A2. When the regulated part B2 is caught on the regulating part A2 in this manner, the rotation of the regulated part B2 to the R4 direction is regulated.

As explained so far, rotation of the regulated part B2 about the axis ax12 is regulated, whereby rotation of the rotary part 120 relative to the base part 110 about the axis ax12 is regulated.

Figure 14:
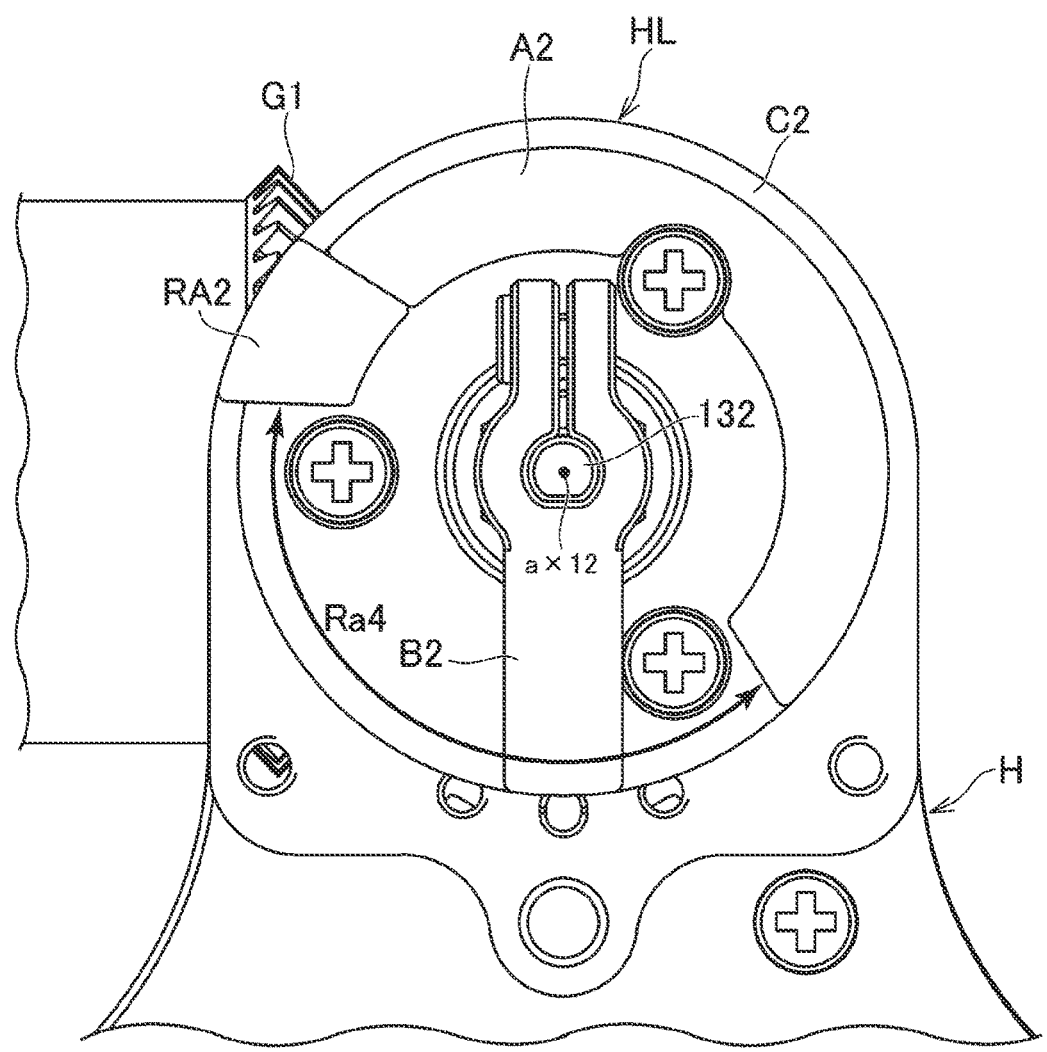
FIG. 14 is a left side view of the movable range defining member mounted on the regulating part illustrated in FIG. 13.

In the first joint mechanism 10 according to the present embodiment, a movable range defining member RA2 is mounted on the regulating part A2. FIG. 14 is a left side view of a movable range defining member mounted on the regulating part illustrated in FIG. 13.

The movable range defining member RA2 sets the movable range of the regulated part B2 to a second movable range Ra4 that is narrower than a first movable range Ra3 which is illustrated in FIG. 13. The movable range defining member RA2 is separate from the regulating part A2, and is preferably attachable to/detachable from the regulating part A2.

FIG. 14 illustrates an example in which the movable range defining member RA2 is mounted on one end side of the regulating part A2 in the circumferential direction of the axis ax12. However, the movable range defining member RA2 is not limited to this example. It is sufficient to dispose the movable range defining member RA2 in such a way that the movable range of the regulated part B2 becomes narrower than at least the first movable range Ra3 illustrated in FIG. 13. For example, the movable range defining members RA2 may be mounted on both ends of the regulating part A2 in the circumferential direction of the axis ax12. Alternatively, the movable range defining member RA2 may be disposed apart from the regulating part A2 in the circumferential direction of the axis ax12. In this case, on the extension of the rotation locus of the regulated part B2 about the axis ax12, the movable range defining member RA2 may be fixed to the exterior housing H of the base part 110, for example.

In the present embodiment, since the movable range defining member RA2 is used, the movable range of rotation of the rotary part 120 about the axis ax12 can be controlled according to the purpose of use of the first joint mechanism 10, etc. Therefore, as a result of use of the first joint mechanism 10 according to the present embodiment, it is not necessary to prepare joint mechanisms having different movable ranges according to respective purposes of use. Consequently, a cost increase can be suppressed.

Further, since the regulated part B2 comes into contact with the regulating part A2 according to rotation of the regulated part B2 about the axis ax12, the regulating part A2 may be worn out and deteriorate after a long-term use. In the present embodiment, since the movable range defining member RA2 is mounted so as to cover a portion of the regulating part A2 with which the regulated part B2 comes into contact, the regulating part A2 is inhibited from being worn out or deteriorating. That is, the movable range defining member RA2 additionally has a function of protecting the regulating part A2. If the movable range defining member RA2 is worn out and deteriorates, the movable range defining member RA2 may be removed from the regulating part A2, and be replaced with a new one. Since the movable range defining member RA2 is replaceable, it is not necessary to replace the first joint mechanism 10 itself even when the movable range defining member RA2 is worn out and deteriorates. Thus, a cost increase can be suppressed.

[Others]

The first joint mechanism 10 has been explained with reference to FIGS. 5 to 14. It is preferable that the second joint mechanism 20 and the third joint mechanism 30 also have the same configuration. That is, it is preferable that the first joint mechanism 10, the second joint mechanism 20, and the third joint mechanism 30 are identical to each other. Further, the presence/absence of the movable range defining members RA1 and RA2 is preferably decided according to the purpose of use or according to a position. In the multi-joint device 1 illustrated in FIGS. 1 to 4, the movable range defining member RA2 is mounted on the regulating part A2 in each of the first joint mechanism 10 and the third joint mechanism 30, while no movable range defining member is mounted on the regulating part A2 of the second joint mechanism 20. In this configuration, the rotational movable range of the first joint mechanism 10 about the axis ax12 is equal to the rotational movable range of the third joint mechanism 30 about the axis ax32. On the other hand, the rotational movable range of the second joint mechanism 20 about the axis ax22 is wider than the rotational movable range of the first joint mechanism 10 about the axis ax12. It is to be noted that the presence/absence of the movable range defining member RA1 which is mounted on the regulated part B1 of the first bevel gear G1 is also preferably decided according to the purpose of use or according to a position. This is not illustrated in the drawings though.

It is to be noted that the multi-joint device 1 is preferably used for a human or animal-form robot that can walk on two legs or four legs, for example. In a case where the multi-joint device 1 including a plurality of joint mechanisms is used for an arm of a human form robot, for example, one of the joint mechanisms is used as a shoulder joint, and another joint mechanism is used as an elbow joint.

The multi-joint device 1 including the three joint mechanisms has been explained in the present embodiment. However, the number of joint mechanisms is not limited, and thus, the number may be one, two, four, or greater.

In the multi-joint device 1 illustrated in FIG. 1, etc., any other joint mechanism may be additionally connected to the connection object part 11 of the first joint mechanism 10 or the connecting part 32 of the third joint mechanism 30. Further, an end effector of any type may be additionally connected to the connection object part 11 or the connecting part 32.

In the above-mentioned embodiment, the second bevel gear G2 and the third bevel gear G3 rotate in the same direction or in the opposite directions, when viewed from the same direction. Alternatively, either the second bevel gear G2 or the third bevel gear G3 may be driven to rotate while the other gear is stopped. In this case, the rotary part 120 rotates relatively to the base part 110 so as to be twisted with respect to the axis ax11 and the axis ax12, but a detailed explanation thereof will be omitted.

In addition, it is preferable that the regulating part A2 is formed so as to come into surface-contact with the regulated part B2. If so, in a state where the movable range defining member RA2 is not mounted, the regulating part A2 receives, by a surface thereof, a shock caused by the contact with the regulated part B2, and a local force is inhibited from acting on the regulating part A2. As a result, the durability of the regulating part A2 is improved, and the life of the regulating part A2 is increased. In addition, it is preferable that the movable range defining member RA2 is also formed so as to come into surface-contact with the regulated part B2. If so, the movable range defining member RA2 receives, by a surface thereof, a shock caused by the contact with the regulated part B2, and a local force is inhibited from acting on the movable range defining member RA2. As a result, the durability of the movable range defining member RA2 is improved, and the life of the movable range defining member RA2 is increased.

In the present embodiment, the movable range defining member RA2 is mounted on the regulating part A2 that is disposed on the rear surface side of the second bevel gear G2 and the spur gear SG1, whereby an access to the movable range defining member RA2 from the outside can be easily made. That is, it is easy to attach/detach the movable range defining member RA2 to/from the regulating part A2.

In the above-mentioned embodiment, the regulated part B1 is disposed on the inner circumferential surface of the center hole h11 in the first bevel gear G1. Alternatively, the regulated part B1 may be disposed on the rear surface side of the first bevel gear G1. If so, the regulating part A1 is preferably disposed on a projection that is a portion, of the first support shaft 131, projected from the rear surface side of the first bevel gear G1. In this case, however, it is difficult to connect another member to the connection object part 11 of the rotary part 120. That is, when the configuration of the present embodiment in which the regulated part B1 is disposed on the inner circumferential surface of the center hole h11 in the first bevel gear G1 is adopted, a structure in which another member can be easily connected to the rotary part 120 of the first joint mechanism 10, is realized.

In the present embodiment, the movable range defining member RA1 is mounted on the regulated part B1. Alternatively, the movable range defining member RA1 may be mounted on the regulating part A1. Also, in the present embodiment, the movable range defining member RA2 is mounted on the regulating part A2. Alternatively, the movable range defining member RA2 may be mounted on the regulated part B2.

Incidentally, in the present embodiment, the base part 110 is fixed while the rotary part 120 rotates. However, it is sufficient that the rotary part 120 rotates relatively to the base part 110. That is, if the rotary part 120 is fixed, the base part 110 may rotate. In this case, the regulated part B1 functions as a member for regulating rotation of the regulating part A1, while the regulated part B2 functions as a member for regulating rotation of the regulating part A2.

The invention claimed is:

1. A joint mechanism including a base part and a rotary part that rotates relatively to the base part, the joint mechanism comprising:
    a regulated part that is disposed on an inner circumferential surface of the rotary part and rotates together with the rotary part, wherein the rotary part includes a first bevel gear that rotates about a first axis direction;
    a regulating part that is disposed on an extension of a rotation locus of the regulated part, and has a function of regulating rotation of the regulated part relative to the base part, within a first movable range, wherein the base part includes a second bevel gear that is engaged with the first bevel gear and that rotates about a second axis direction intersecting with the first axis direction, and a third bevel gear that is engaged with the first bevel gear, is disposed so as to face the second bevel gear with respect to an extension direction of the second axis direction, and rotates about the second axis direction;
    a second regulated part that rotates about the second axis direction relatively to the base part;
    a second regulating part that is disposed on an extension of a rotation locus of the second regulated part; and
    a movable range defining member that is mounted on either the base part or the rotary part, and defines, as a movable range of the regulated part, a second movable range that is narrower than the first movable range.

2. The joint mechanism according to claim 1, wherein the movable range defining member is mounted on either the regulated part or the regulating part.

3. The joint mechanism according to claim 1, wherein
    the inner circumferential surface is of a center hole that is formed coaxially with the first axis direction in the first bevel gear, and
    the regulating part is disposed on a first support shaft that supports the first bevel gear.

4. The joint mechanism according to claim 3, wherein a connection object part to which a member that is external to the joint mechanism is connected is disposed on a rear surface side of the first bevel gear in the rotary part.

5. The joint mechanism according to claim 4, further comprising:
   a second support shaft that supports the second bevel gear and the third bevel gear, wherein
   the second regulated part is disposed on the second support shaft, and
   the second regulating part is disposed on the base part.

6. The joint mechanism according to claim 5, wherein the second regulated part is mounted on a projection that is a portion, of the second support shaft, projected from the rear surface side of the second bevel gear.

7. The joint mechanism according to claim 3, wherein the movable range defining member is mounted on at least the regulated part.

8. The joint mechanism according to claim 3, wherein the joint mechanism further comprises a second movable range defining member that is mounted on at least the second regulating part.

9. A multi-joint device comprising:
   at least two joint mechanisms each including a base part and a rotary part that rotates relatively to the base part, the joint mechanism including
      a regulated part that is disposed on an inner circumferential surface of the rotary part and rotates together with the rotary part, wherein the rotary part includes a first bevel gear that rotates about a first axis direction;
      a regulating part that is disposed on an extension of a rotation locus of the regulated part, and has a function of regulating rotation of the regulated part relative to the base part, within a first movable range, wherein the base part includes a second bevel gear that is engaged with the first bevel gear and that rotates about a second axis direction intersecting with the first axis direction, and a third bevel gear that is engaged with the first bevel gear, is disposed so as to face the second bevel gear with respect to an extension direction of the second axis direction, and rotates about the second axis direction,
   a second regulated part that rotates about the second axis direction relatively to the base part,
   a second regulating part that is disposed on an extension of a rotation locus of the second regulated part, and
   a movable range defining member that is mounted on either the base part or the rotary part, and defines, as a movable range of the regulated part, a second movable range that is narrower than the first movable range, wherein:
   the at least two joint mechanisms include a first joint mechanism and a second joint mechanism, and
   the movable range defining member is mounted on at least one of the first joint mechanism or the second joint mechanism.

\* \* \* \* \*